United States Patent [19]
Gibbons et al.

[11] Patent Number: 6,012,064
[45] Date of Patent: Jan. 4, 2000

[54] MAINTAINING A RANDOM SAMPLE OF A RELATION IN A DATABASE IN THE PRESENCE OF UPDATES TO THE RELATION

[75] Inventors: Phillip B. Gibbons, Westfield, N.J.; Yossi Matias, Tel Aviv, Israel; Viswanath Poosala, Highland Park, N.J.

[73] Assignee: Lucent Technologies Inc., Murray Hill, N.J.

[21] Appl. No.: 08/915,774

[22] Filed: Aug. 21, 1997

[51] Int. Cl.$^7$ ...................................................... G06F 17/30
[52] U.S. Cl. ................................. 707/103; 707/3; 707/4; 707/101; 707/102
[58] Field of Search ................................. 707/1, 2, 3, 4, 707/5, 6, 7, 10, 100, 101, 102, 103, 104, 200

[56] References Cited

U.S. PATENT DOCUMENTS

| | | | |
|---|---|---|---|
| 4,956,774 | 9/1990 | Shibamiya et al. | 707/2 |
| 5,379,422 | 1/1995 | Antoshenkov | 707/1 |
| 5,555,191 | 9/1996 | Hripcsak | 395/200.54 |
| 5,630,120 | 5/1997 | Vachey | 707/2 |
| 5,675,786 | 10/1997 | McKee et al. | 707/103 |
| 5,696,964 | 12/1997 | Cox et al. | 707/5 |
| 5,758,338 | 5/1998 | Faloutsos et al. | 707/6 |
| 5,794,229 | 8/1998 | French et al. | 707/2 |
| 5,893,090 | 4/1999 | Friedman et al. | 707/3 |

OTHER PUBLICATIONS

Harangsri, B. et al., selectiveity estimation for joins using systematic sampling, database and expert system applications, 1997, proceedings, eight international workshop, and 384–389, Sep. 1997.

Zaki, M.J et al., evaluation of sampling for data mining of asociation rules, research issues in data engineering, 1997, proceedings, seventh international workshop, and 42–50, Apr. 1997.

Duncan, GT, et al., microdata disclosure limitation in statistical databases: query size and random sample query control, research in security and privacy, 1991, proceedings;1 1991 IEEE computer society symposium, and 278–287, May 1991.

Olken, F, et al., maintenance of materialized views of sampling queries, data engineering, 1992, proceedings, eighth international conference and 632–641, Feb. 1992.

(List continued on next page.)

*Primary Examiner*—Jack M. Choules
*Assistant Examiner*—Srirama Channavajjala

[57] ABSTRACT

Techniques for maintaining a random sample of a relation in a database in the presence of updates to the relation. The random sample of the relation is referred to as a "backing sample," and it is maintained in the presence of insert, modify and delete operations involving the relation. When a new tuple is inserted into the relation, a sample of the given tuple is added to the backing sample if the size of the backing sample is below an upper bound. Otherwise, a randomly-selected tuple of the backing sample is replaced with the new tuple if a sample of the new tuple must be inserted into the backing sample to maintain randomness or another characteristic. When a tuple in the relation is the subject of a modify operation, the backing sample is left unchanged if the modify operation does not affect an attribute of interest to an application which uses the backing sample. Otherwise, a value field in a sample of the tuple in the backing sample is updated. When a tuple is deleted from the relation, any sample of that tuple in the backing sample is removed. A new backing sample may be computed if this removal causes the size of the backing sample to fall below a prespecified lower bound. The backing sample can be of a size which is negligible in comparison to the relation, and need only be modified very infrequently. As a result, its overhead in terms of computation time and storage space is minimal.

26 Claims, 4 Drawing Sheets

OTHER PUBLICATIONS

Frank Olken et al., "Random Sampling from Databases—A Survey," Information and Computing Sciences Div., CA and Management Information Systems, CA, pp. 1–55, Mar. 1994; Draft of Mar. 22, 1994.

Frank Olken, "Random Sampling from Databases," PhD thesis, University of California, Berkeley, pp. 1–158, Jun. 1993.

J.S. Vitter, "Random Sampling with a Reservoir," ACM Transactions on Mathematical Software, vol. 11, No. 1, pp. 37–57, Mar. 1985.

MAINTAINING A RANDOM SAMPLE OF A RELATION IN A DATABASE IN THE PRESENCE OF UPDATES TO THE RELATION

FIELD OF THE INVENTION

The invention relates generally to database management techniques, and more particularly to techniques for maintaining a random sample of a relation stored in a database system, in the presence of updates to the relation.

BACKGROUND OF THE INVENTION

Databases store large amounts of data in the form of "relations," which may be viewed as tables of data items. The size of a given relation may be on the order of several megabytes to several gigabytes or more, depending on the application. A relation stores the data items, which are also referred to as records or "tuples," in a predetermined format. For example, a relation in a database of bank customers may be structured to hold categories of information such as customer name, account number, account balances and the like. Each category is referred to as an "attribute" of the relation. The particular values entered in the attribute of a relation for a given customer constitute tuples of that relation. In many applications, relations are continuously updated as tuples are inserted, deleted or modified during normal operation of the database. A database management system (DBMS) is used to manage these updates as well as other database operations, such as query processing, evaluation and optimization.

It is often desirable for a given DBMS to be able to estimate the characteristics of database relations. For example, query optimizers of most relational database systems decide on the most efficient access plan for a given query based on estimates of the intermediate result sizes of queries and the costs of executing various plans, as described in P. Selinger, M. Astrahan, D. Chamberlin, R. Lorie and T. Price, "Access path selection in a relational database management system," Proc. of ACM SIGMOD Conf., pp. 23–34, 1979. Also, quick estimates of query result characteristics can be useful to a user during query design and in providing approximate answers to queries, as described in, for example, J. M. Hellerstein, P. J. Haas and H. J. Wang, "Online aggregation," Proc. of ACM SIGMOD Conf., 1997.

Most DBMSs therefore maintain a variety of statistics on the contents of database relations in order to perform various estimations. These statistics usually take the form of approximations of the distributions of particular data values in attributes of the relations. Since the statistics are used to estimate the values of several parameters of interest to optimizers, the validity of the optimizer's decisions may be affected by the quality of these approximations, as described in S. Christodoulakis, "Implications of certain assumptions in database performance evaluation," ACM TODS, 9(2): 163–186, June 1984. In fact, it has been established in Y. Ioannadis and S. Christodoulakis, "On the propagation of errors in the size of join results," Proc. of ACM SIGMOD Conf , pp. 268–277, 1991, that selectivity estimation errors propagate exponentially with the number of operators in the query and hence will ultimately result in a poor-quality plan being chosen by the optimizer. This is becoming very important in the context of increasingly complex queries, such as decision support and data analysis queries.

A commonly-used technique for selectivity estimation involves maintaining histograms on the frequency distribution of an attribute. A histogram groups attribute values into subsets, referred to as "buckets," and approximates true attribute values and their frequency distributions based on summary statistics maintained in each bucket. Since histograms are just summaries of actual, much larger distributions, any estimations based on histograms may still incur errors. Nonetheless, for most real-world databases, there exist histograms that produce acceptable low-error estimates while occupying reasonably small space, which may be on the order of only hundreds of bytes. Histograms are used in conventional DBMSs such as DB2, Informix, Ingres, and Microsoft SQL Server, as well as in other DBMSs from Oracle, Sybase, and Teradata. Histograms are also being used to provide various estimates in other database management applications, such as parallel join load balancing, as described in V. Poosala and Y. Ioannidis, "Estimation of query-result distribution and its application in parallel-join load balancing," Proc. of the $22^{nd}$ Int. Conf. on Very Large Databases, September, 1996, which is incorporated by reference herein.

Histogram computation and other types of selectivity estimation for a given database relation can be facilitated through the use of a random sample of the relation. For example, uniformly random samples of the data in a database relation can be precomputed and then maintained in the presence of updates to the relation. This avoids the need to compute samples dynamically at usage time, which is a significant drawback of conventional sampling-based estimation techniques. In most sampling-based estimation techniques, whenever a sample of size n is needed, either the entire relation is scanned to extract the sample, or several random disk blocks are read. In the latter case, the tuples in a disk block may be highly correlated, and hence to obtain a truly random sample, n disk blocks must be read. Sampling-based estimation techniques which utilize dynamic sampling are therefore very inefficient. Although precomputed random samples can provide considerable improvements over dynamic sampling, conventional techniques for generating random samples are unable to accommodate the requirements of database management techniques such as histogram computation and other types of selectivity estimation.

SUMMARY OF THE INVENTION

The invention provides techniques for maintaining a random sample of a set of tuples in a relation, such that the sample is kept up-to-date in the presence of updates to the relation. The random sample is configured in the form of a data structure referred to as a "backing sample" which may be stored in consecutive blocks of a disk-based memory. An illustrative embodiment of the invention maintains the backing sample in the presence of insert, modify and delete operations on the corresponding relation. When a new tuple is inserted into the relation, an identifier of the tuple and at least one attribute value of the tuple are added to the backing sample if the size of the backing sample is below a pre-specified upper bound. If the size of the backing sample is not below the upper bound, a randomly-selected tuple of the backing sample is replaced with the new tuple if the new tuple must be inserted into the backing sample in order to maintain a desired characteristic of the backing sample.

As noted above, the backing sample maintenance of the invention also handles modify and delete operations. When a modify operation involving a tuple in the relation is executed, the backing sample is left unchanged if the modify operation does not affect an attribute of interest to an application which will be using the backing sample. If the modify operation does affect an attribute of interest to the application, a value field of the tuple in the backing sample is updated. When a tuple is deleted from the relation, the identifier and any attribute values of the deleted tuple are removed from the backing sample. If the deletion causes the size of the backing sample to fall below a lower bound, a new backing sample may be computed from the relation.

The invention provides efficient techniques for maintaining the backing sample as a uniform and random representative of the relation in the presence of updates to the relation. The size of the backing sample can be made negligible in comparison to the size of the relation, and need only be modified very infrequently. Therefore, the overhead associated with the backing sample in terms of computation time and storage space are insignificant. The backing sample techniques of the invention are completely general, and can be used in any database application that relies on random samples of data in the presence of updates.

DETAILED DESCRIPTION OF THE INVENTION

The present invention will be illustrated below in conjunction with exemplary database systems. It should be understood, however, that the invention is not limited to use with any particular type of database system or configuration, but is instead more generally applicable to any data storage application in which it is desirable to provide efficient incremental maintenance of a random sample in the presence of updates. A "relation" refers to a set of associated data stored in a database or other storage device. An "attribute" of a relation refers to a specific category of data in the relation. The term "tuple" as used herein refers to a particular data item or record to be stored in a table or other type of relation. The term "database system" should be understood to include any type of system in which tuples are stored or processed in one or more physical locations. The term "backing sample" is intended to include any type of random sample of a relation or other set of data in a database.

Figure 1:
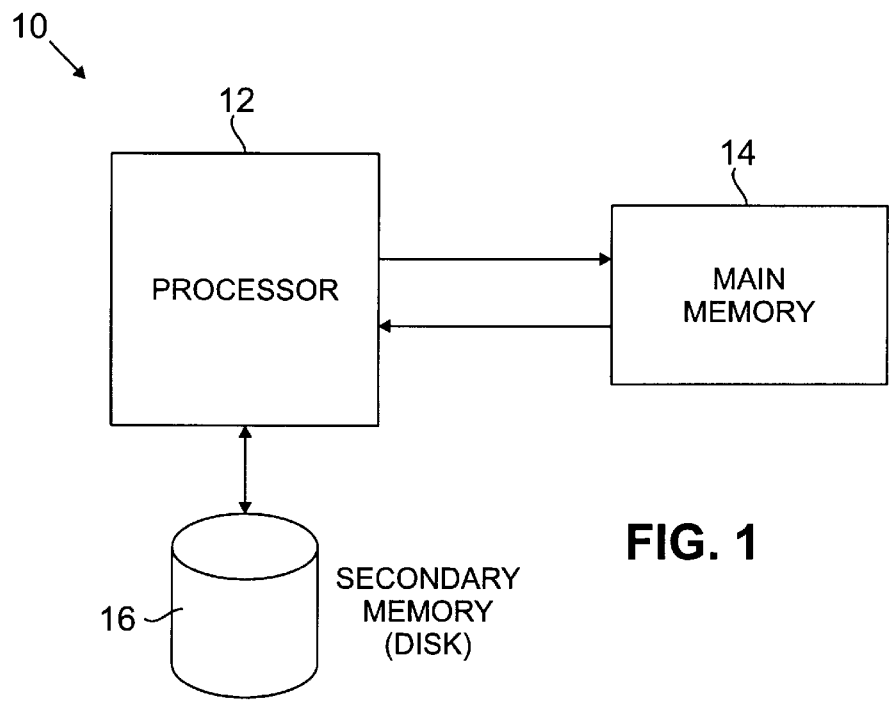
FIG. 1 shows an exemplary database system in which the backing sample maintenance techniques of the present invention may be implemented.

FIG. 1 shows an exemplary database system 10 in which incremental maintenance of a random sample may be implemented in accordance with the invention. The system 10 includes a processor 12 connected to communicate with a main memory 14 and a secondary memory 16. The processor 12 can be implemented as a personal, micro or mainframe computer, a workstation, a microprocessor, a central processing unit, an application-specific integrated circuit (ASIC) or other digital data processor, as well as various portions or combinations thereof. The main memory 14 is typically an electronic memory associated with the processor 12. The secondary memory 16 is typically an external magnetic or optical disk-based memory, but may also be a magnetic tape memory, an electronic memory, or other suitable data storage device. The main and secondary memories of the system 10 may represent storage locations of data warehouses, data marts or other large databases having storage capacities of up to a few terabytes, smaller localized database memories, or even memories associated with desktop or portable computers.

The backing sample maintenance techniques of the invention, which will be described in greater detail below in conjunction with the flow diagram of FIGS. 4A, 4B, and 4C may be implemented as a software program stored in portions of one or both of the memories 14 and 16, and executed by processor 12. The software program may be configured to generate a backing implement, evaluate and otherwise process maintenance of a backing sample from a database or databases associated with one or both of the memories 14 and 16. The system 10 may also utilize processor 12 and memories 14, 16 to provide conventional database processing capabilities such as those described in, for example, H. F. Korth and A. Silberschatz, "Database System Concepts," Second Edition, McGraw-Hill, New York, 1991, and R. Elmasri and S. B. Navathe, "Fundamentals of Database Systems," Benjamin/Cummings, Redwood City, Calif. 1989, both of which are incorporated by reference herein.

Figure 2:
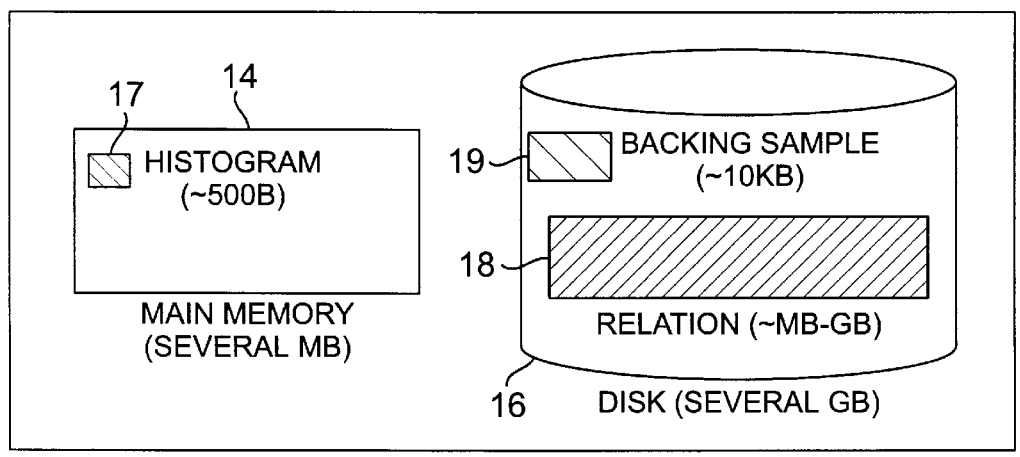
FIG. 2 illustrates the relative size of a relation, a backing sample and a histogram in an exemplary embodiment of the invention.

FIG. 2 illustrates the relative sizes of a histogram, backing sample and relation in an exemplary embodiment of the invention. In this embodiment, a histogram 17 is stored in the main memory 14 of system 10. The main memory 14 has a storage capacity on the order of several megabytes (MB), while the histogram 17 occupies only about 500 bytes. As noted above, a histogram groups attribute values of a database relation into subsets, referred to as "buckets," and approximates true attribute values and their frequency distributions based on summary statistics maintained in each bucket. Histograms produce acceptable low-error estimates of the data in a given relation, while occupying a very small storage space. The secondary memory 16 in this embodiment is a disk which stores a relation 18 and a backing sample 19 which characterizes the relation 18. The secondary memory 16 has a storage capacity on the order of several gigabytes (GB). The relation 18 occupies a space which may be on the order of a few megabytes to a gigabyte or more, while the backing sample 19 of the relation 18 occupies only about 10 kilobytes. It should be emphasized that the sizes of the various elements of FIG. 2 are illustrative only, and should not be construed as limiting the invention to any particular application. Moreover, although the backing sample is shown in FIG. 2 as stored in the secondary or disk-based memory 16, the backing sample could be stored in the primary memory 14 in other embodiments.

Figure 3:
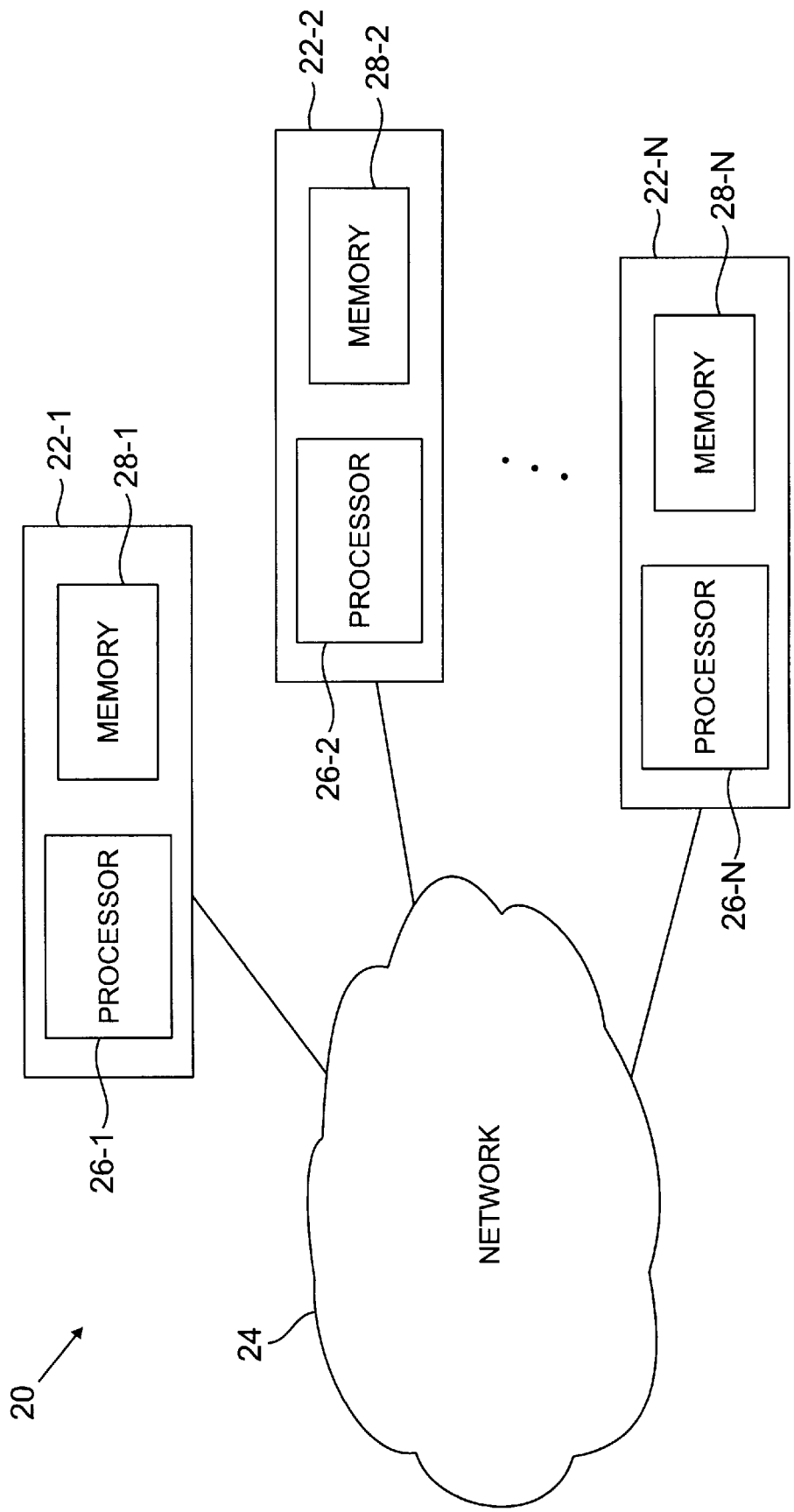
FIG. 3 shows a distributed database system the backing sample maintenance techniques of the present invention may be implemented.

FIG. 3 shows an exemplary distributed database system 20 in which the backing sample maintenance techniques of the invention may be implemented. The system 20 includes N physical sites 22-i, i=1, 2, ... N connected by a network 24. The network 24 may be a local area network, a metropolitan area network, a wide area network, a global data communications network such as the Internet, a private "intranet" network or any other suitable data communication medium. The sites 22-i may be centralized database systems such as data warehouses or data marts, remote customer sites such as automatic teller machines or desktop personal computers, portable computers or other mobile computing devices, or any other type of data processors. Each of the N sites 22-i includes a processor 26-i and a memory 28-i. The memory 28-i may be, for example, a large centralized database system, or a memory of a desktop or portable personal, depending upon the nature of the corresponding physical site 22-i. One or more of the memories 28-i may be configured to include both a primary memory 14 and a secondary memory 16 as shown in FIG. 1. The processors 26-i may each run a local database management system. Like the processor 12 of FIG. 1, the processors 26-i can be implemented as personal, micro or mainframe computers, workstations, microprocessors, central processing units, ASICs or other digital data processors, as well as various portions or combinations thereof.

The memories 28-i may utilize electronic, magnetic or optical storage media, or various combinations thereof, and as previously noted may represent storage locations of data warehouses or data marts having storage capacities of up to a few terabytes, or memories of desktop or portable computers. The storage and retrieval of data items from a memory 28-i of a given site 22-i is controlled by the corresponding processor 26-i using the local database management system. The sites 22-i of system 20 may each run multiple transactions, such as read and write transactions, during which data items stored at other sites are accessed and processed in accordance with insert, delete and modify operations. One or more of the sites 22-i of FIG. 3B may execute a software program which generates and maintains backing samples of database relations in a database or databases associated with one or more of the memories 28-i.

A "backing sample" in accordance with the invention is a random sample of the tuples in a given database relation, which can be maintained as a uniform and random sample in the presence of updates to the relation. The backing sample includes one or more attribute values for each of a selected set of tuples. The backing sample can be considered a dynamically-maintained approximate materialized view of the relation, for a given random sample of the tuples in the relation. As shown in conjunction with FIG. 2, an illustrative backing sample may be stored in a secondary memory of a database system, and occupies a substantially smaller amount of memory than the relation it represents. In an exemplary embodiment of the invention, the size of the backing sample can be considered essentially negligible in comparison to its relation, and need only be updated very infrequently. Overhead associated with the backing sample, in terms of both storage space and computation resources, is minimal in most important database management applications. The backing sample is quite useful for histogram computation, selectivity estimation, and other important database management operations. As noted previously, the backing sample can be used in any application that relies on generating random samples of large amounts of stored data in the presence of updates.

The backing sample in one embodiment of the invention is stored as one or more consecutive blocks in a disk-based secondary memory of a database system, such as secondary memory 16 of FIG. 2. It will often be possible to store the backing sample as consecutive blocks on a single disk of the disk-based memory. Advantageously, the backing sample need only be modified very infrequently for a large relation. Unlike conventional techniques based on dynamic sampling, the backing sample of the invention can be generated without scanning the entire relation to extract the sample, and without reading several random disk blocks. A backing sample in accordance with the invention can be stored in consecutive disk blocks, and can therefore be scanned by reading sequential disk blocks. Moreover, an indexing structure for the backing sample can be stored in primary memory, which would enable quick access of the sample values within a certain range.

At any given time, a backing sample S maintained for a relation R should be substantially equivalent to a random sample of the same size that would be extracted from R at that time. Thus the sample should be updated to reflect any updates to R, but in a way that avoids the computation and storage overheads normally associated with such costly extractions. Techniques will be described below for maintaining a provably random backing sample of relation R based on the sequence of updates to R, while only infrequently accessing R. It will generally be necessary to access R only in the event of very substantial changes to R, such as when the size of R has shrunk dramatically due to deletion of half of its tuples.

The effect of insertions to relation R on the backing sample S will be considered first. The technique for maintaining S as a random sample in the presence of inserts makes use of a reservoir sampling algorithm, described in J. S. Vitter, "Random Sampling with a Reservoir," ACM Transactions on Mathematical Software, Vol. 11, No. 1, pp. 37–57, March 1985, which is incorporated by reference herein. In conventional database management systems, a reservoir sampling algorithm is used to obtain a sample of the data during a single scan of the relation without any a priori knowledge about the number of tuples in the relation. A particular version of the reservoir algorithm suitable for use in this embodiment of the invention is referred to as "Algorithm X" in the Vitter reference. This exemplary reservoir sampling algorithm proceeds by inserting the first n tuples into a "reservoir." Then a random number of tuples are skipped, and the next tuple replaces a randomly selected tuple in the reservoir. Another random number of tuples are then skipped, and so forth, until the last tuple has been scanned. The distribution function of the length of each random skip depends explicitly on the number of tuples scanned so far, and is chosen such that each tuple in the relation is equally likely to be in the reservoir after the last tuple has been scanned. The reservoir sampling algorithm treats a tuple being inserted in the relation as the next tuple in the scan of the relation, and can therefore be used to obtain a random sample of the data only in the presence of insertions in the relations.

The backing sample maintenance of the invention utilizes operations based on those of the above-described reservoir sampling algorithm to handle insertions, and provides additional processing to handle modify and delete operations. The resulting process for maintaining a backing sample S of a relation R is illustrated in FIGS. 4A, 4B and 4C. For each tuple τ selected for S, a unique row identifier of τ is stored in S along with the value or values of any attributes A of interest to an application which will be utilizing S. For example, in histogram computation applications, S should store the value of the attribute on which the histogram is to be computed. For simplicity of illustration, the process is shown for the case of a single attribute A of interest, although the fact that the process can be extended in a straightforward manner to multiple attributes will be readily apparent to those skilled in the art. The backing sample maintenance process of FIGS. 4A, 4B and 4C maintains the property that the backing sample S is a uniform random sample of R such that min ($|R|$, L)$\leq|S|\leq$U, where $|R|$ is the size of the relation R, $|S|$ is the size of the backing sample S, and L and U are respective prespecified lower and upper bounds for the size of S.

Figure 4A:
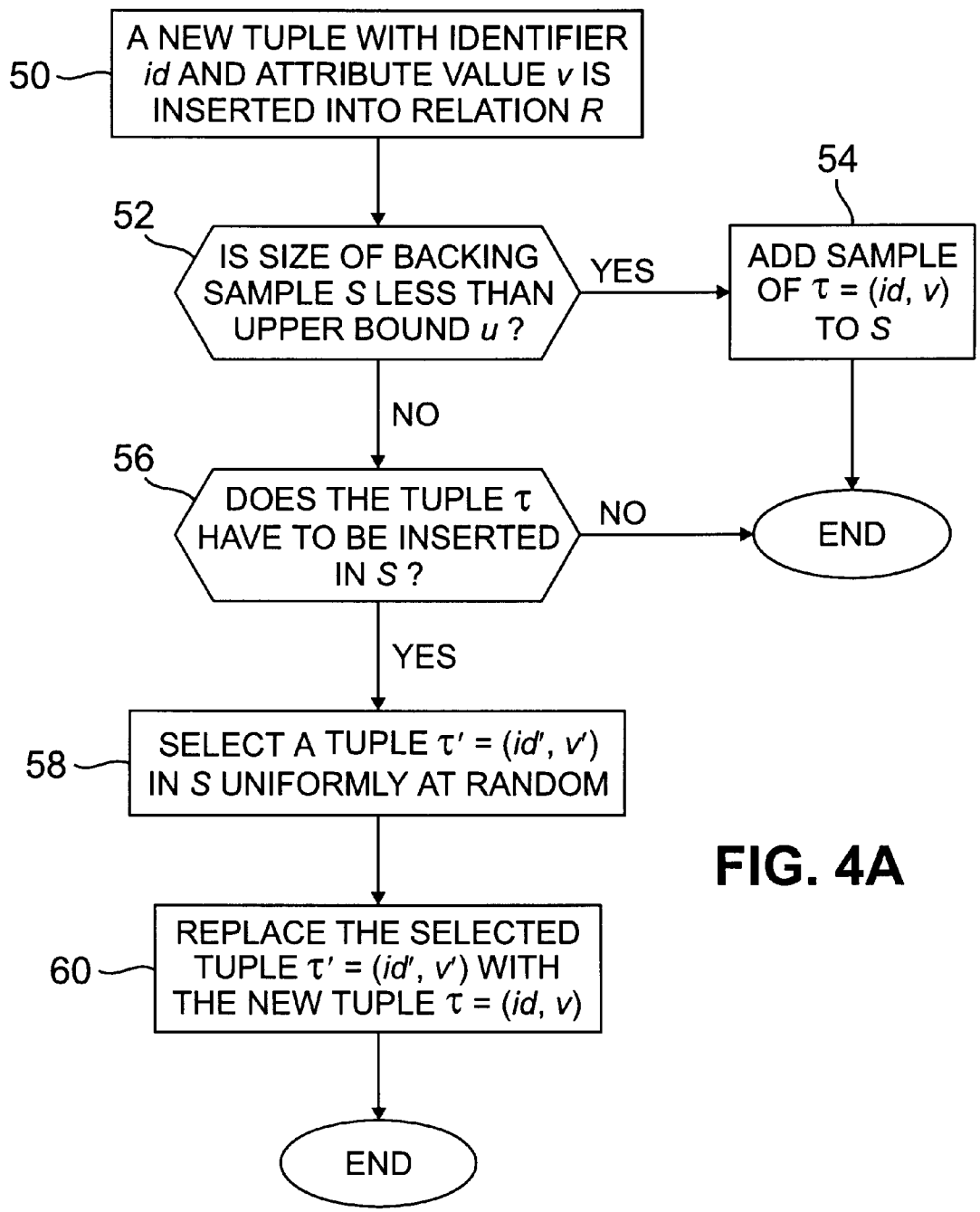
FIGS. 4A, 4B and 4C comprise a flow diagram illustrating a backing sample maintenance technique in accordance with the invention.

FIG. 4A illustrates the backing sample maintenance of the invention in the presence of insert operations. In step 50, a new tuple τ with a row identifier id and attribute value v is inserted into the relation R. Step 52 determines whether the size of the backing sample S is less than the upper bound U. If it is, a sample of the new tuple τ is added to backing sample S, as shown in step 54, and the process ends for the given insert operation. If the size of the backing sample S is determined in step 52 to be not less than the upper bound U, a determination is made in step 56 as to whether a sample of the tuple has to be inserted in S. If it does not have to be inserted in S, the process ends for the given insert as shown. If step 56 determines that a sample of the tuple has to be inserted in S, a tuple τ' with identifier id' and attribute value v' is selected uniformly and at random from S in step 58, and the selected tuple ' =(id', v') is replaced with the new tuple τ=(id, v) in step 60. The process then ends for the given insert.

Figure 4B:
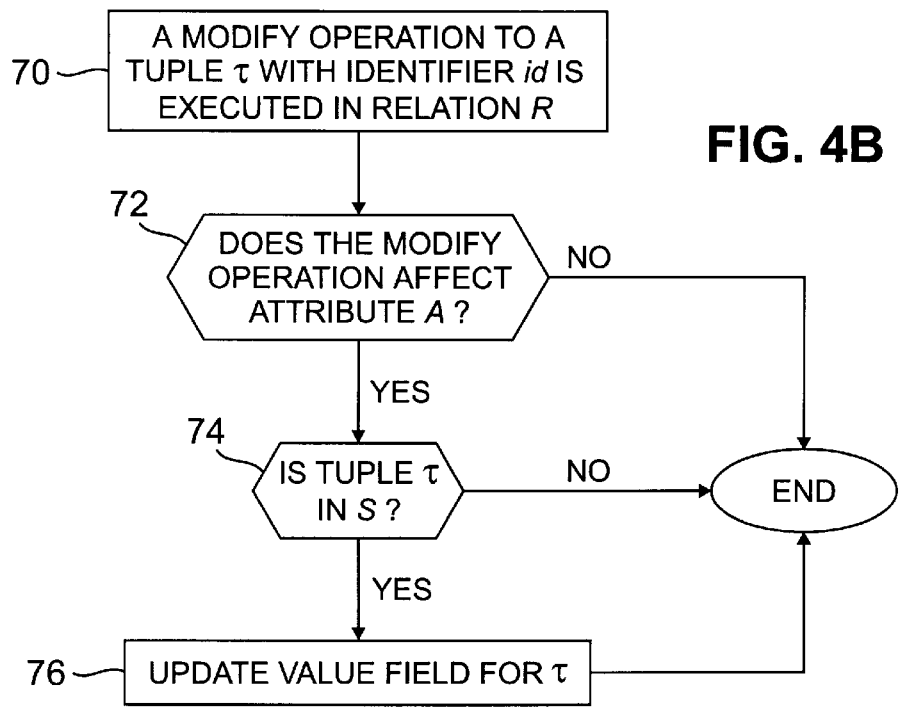

FIG. 4B illustrates backing sample maintenance in the presence of modify operations. It will be shown that modify operations may be handled by updating a value field of a given tuple, if the tuple is already in the backing sample S. In step 70, a modify operation to a tuple τ=(id, v) in relation R is executed. In step 72, a determination is made as to whether the modify operation affects an attribute A of interest to an application using the backing sample S. If the modify operation does not affect the attribute A, the process ends for the given modify operation. If the modify operation affects the attribute A, step 74 determines whether the tuple τ=(id, v) is in the backing sample S. If the tuple τ is in S, the value v field for the tuple τ in S is updated in step 76, and the process ends for the given modify operation.

Figure 4C:
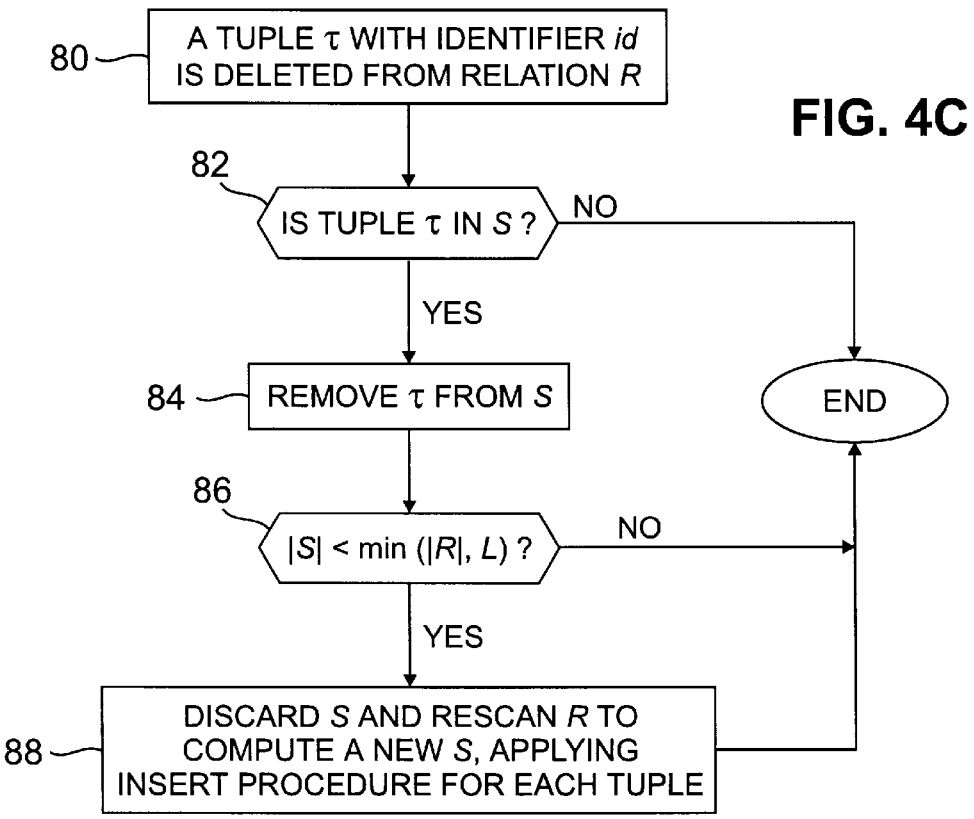

FIG. 4C illustrates backing sample maintenance in the presence of delete operations. In step 80, a tuple τ with identifier id and attribute value v is deleted from the relation R. A determination is made in step 82 as to whether this tuple is in S. If the tuple τ is not in S, the delete operation does not alter S, and the process ends for the delete operation. If step 82 determines that tuple τ is in S, the tuple τ is removed from S, as shown in step 84, and the process continues with step 86. Step 86 determines if $|S| < \min(|R|, L)$. If it is, step 88 indicates that S is discarded and the relation R is rescanned to compute a new backing sample S. Otherwise, the process ends for the delete operation. The computation of the new backing sample S in step 88 may make use of the above-described insert procedure for each tuple of the relation R.

The process steps of FIG. 4C indicate that delete operations can be handled by removing a deleted tuple from the backing sample S, if it is in S. It can be shown that this process maintains a substantially random sample. However, such deletions decrease the size of the sample from its target size, and moreover, it is generally not known how to use subsequent insertions to obtain a provably random sample of target size n once the sample has dropped below n. Instead, the invention may be configured to maintain a backing sample whose size initially corresponds to the prespecified upper bound U, and to allow for the size of the backing sample to decrease as a result of deletions of tuples down to a prespecified lower bound L. If the backing sample size drops below L, the relation may be rescanned as indicated in FIG. 4C to compute a new random backing sample. It can be shown that such rescans will very rarely occur in databases with infrequent deletions. Moreover, even in the worst case situation where deletions are frequent, the cost of any rescans is "amortized" over the cost of all the deletions that must occur before a rescan becomes necessary.

The backing sample maintenance process of FIGS. 4A, 4B and 4C is illustrated in more detail in the following pseudocode. It can be shown that the algorithm Maintain__Backing__Sample maintains a random sample of a relation R.

Maintain__Backing__Sample (S, R, A, L, U)
 // S is the backing sample, R is the relation, and A is an attribute of interest.
 // L and U are pre-specified lower and upper bounds, respectively, for the sample S.
After an insert of a tuple τ with τ.ID=id and τ.A=v into R:
 if $|S|+1=|R| \leq U$ then
  S:=S+{(id,v)};
 else with probability $|S|/|R|$ do begin
  select an element (id', v') in S uniformly at random;
  S:=S+{(id, v)}−{(id', v')};
 end;
After a modify of a tuple τ with τ.ID=id in R:
 if the update modifies τ.A then do begin
  if id is in S then
   update the value field for element id in S;
 end;
After a delete of a tuple τ with τ.ID=id in R:
 if id is in S then do begin
  remove the element id from S;
  // This next conditional is expected to be true only when a constant fraction
  // of the database updates are deletes
  if $|S| < \min(|R|, L)$ then do begin
   //Discard S and rescan R to compute a new S.
   S:=0
   rescan R, and for each element, apply the above procedure for inserts into R;
  end;
 end;
return;

A number of techniques can be utilized to further lower the overheads associated with the backing sample maintenance process shown in FIGS. 4A, 4B and 4C and the above pseudocode. For example, a hash table of the row identifiers id of the tuples in S can be used to speed up the determination of whether or not a particular identifier is in S. In addition, if the primary source of delete operations is to delete from R all tuples before a certain target date, as is the case in many data warehousing applications that maintain a sliding window of the most recent transactional data on disk, then such deletes can be processed in one step by simply removing all elements in S that are before the target date.

Another possible optimization is based on the fact that the illustrative backing sample maintenance process described above maintains a random sample independent of the order of the updates to the database. It is therefore possible to "rearrange" the order of the updates to facilitate processing, until an up-to-date backing sample is required by the application using the backing sample. For example, the invention may utilize "lazy" processing of modify and delete operations, whereby such operations are placed in a buffer to be processed as a batch whenever the buffer becomes full or an up-to-date backing sample is needed. Similarly, the processing of modify and delete operations can be postponed until the next insert that is selected for S. More specifically, for each insert, a random number of inserts to skip can be selected according to the criterion of the above-described Vitter reservoir sampling algorithm. This criterion is statistically equivalent to flipping a biased coin for each insert. At a given selected insert, all modify and delete operations that have occurred since the last selected insert are processed, and the given insert is then used to replace a randomly selected element in S. Another random number of inserts are then skipped, and so forth. It should be noted that postponing the modify and delete operations can provide significant performance improvements, since it reduces the problem to the insert-only case, and hence the criterion of the Vitter reservoir sampling algorithm can be applied to determine how many inserts to skip.

These and other optimizations allow insert and modify operations directed to attributes which are not of interest to be processed with minimal overhead. Delete and modify operations directed to attributes which are of interest may require a somewhat larger overhead, due to the batch processing of determining whether a particular tuple identifier is in the backing sample. Thus the exemplary embodiment of the invention illustrated in FIGS. 4A, 4B and 4C and the above pseudocode is particularly well-suited for "insert-mostly" databases and data warehousing applications such as the previously-noted sliding window applications.

The above-described embodiments of the invention are intended to be illustrative only. Numerous alternative embodiments within the scope of the following claims will be apparent to those skilled in the art.

What is claimed is:

1. A method of maintaining a random sample of a relation in a database, comprising the steps of:
    adding at least one attribute value of a given tuple, associated with an update to the relation, to the random sample of the relation wherein a size of the random sample is maintained between an upper bound and a lower bound, if the size of the random sample is below the upper bound; and
    replacing a selected tuple of the random sample with the at least one attribute value of the given tuple if the size of the random sample is not below the upper bound.

2. The method of claim 1 wherein the given tuple is a new tuple added to the relation as part of an insert operation of the update.

3. The method of claim 1 wherein the adding step includes adding an identifier of the given tuple along with the at least one attribute value of the given tuple.

4. The method of claim 1 wherein the update includes a modify operation on the given tuple.

5. The method of claim 4 further including the step of updating a value field of the given tuple in the random sample of the relation only if the modify operation affects an attribute of interest to an application utilizing the random sample of the relation.

6. The method of claim 1 wherein the update includes deleting a tuple from the relation.

7. The method of claim 6 further including the step of removing any attribute values of the deleted tuple from the random sample of the relation.

8. The method of claim 7 further including the step of computing a new random sample of the relation if the size of the previous random sample is less than the lower bound after the step of removing any attribute values of the deleted tuple from the random sample.

9. The method of claim 1 further including the step of storing the random sample of the relation in consecutive blocks of a disk-based memory.

10. The method of claim 1 further including the step of storing the random sample of the relation as one or more blocks of a memory such that storage therewith of information not associated with the random sample is reduced.

11. An apparatus for use in maintaining a random sample of a relation in a database, comprising:
    a memory for storing the relation; and
    a processor coupled to the memory and operative to add at least one attribute value of a given tuple, associated with an update to the relation, to the random sample of the relation wherein a size of the random sample is maintained between an upper bound and a lower bound, if the size of the random sample is below the upper bound, and to replace a selected tuple of the random sample with the at least one attribute value of the given tuple if the size of the random sample is not below the upper bound.

12. The apparatus of claim 11 wherein the given tuple is a new tuple added to the relation as part of an insert operation of the update.

13. The apparatus of claim 11 wherein the processor is operative to add an identifier of the given tuple to the random sample along with the at least one attribute value of the given tuple.

14. The apparatus of claim 11 wherein the processor is further operative to execute a modify operation of a given tuple in the relation.

15. The apparatus of claim 14 wherein the processor is further operative to update a value field in the given tuple in the random sample of the relation only if the modify operation affects an attribute of interest to an application utilizing the random sample of the relation.

16. The apparatus of claim 11 wherein the processor is further operative to delete a tuple from the relation.

17. The apparatus of claim 16 wherein the processor is further operative to remove any attribute values of the deleted tuple from the random sample of the relation.

18. The apparatus of claim 17 wherein the processor is further operative to compute a new random sample of the relation if the size of the previous random sample of the relation is less than the lower bound after the attribute values of the deleted tuple are removed from the random sample of the relation.

19. The apparatus of claim 11 wherein the memory is a disk-based memory, and the random sample of the relation is stored in consecutive blocks of the disk-based memory.

20. The apparatus of claim 11 wherein the random sample of the relation is stored in one or more blocks of the memory such that storage therewith of information not associated with the random sample is reduced.

21. A method of maintaining a random sample of a relation in a database, comprising the steps of:
    adding a sample of a given tuple, associated with an update to the relation, to the random sample of the relation wherein a size of the random sample is maintained between an upper bound and a lower bound, when the size of the random sample is below the upper bound; and
    replacing a tuple of the random sample, selected uniformly at random, with the given tuple when the size of the random sample is not below the upper bound.

22. An apparatus for use in maintaining a random sample of a relation in a database, comprising:
    a memory for storing the relation; and
    a processor coupled to the memory and operative to add a sample of a given tuple, associated with an update to the relation, to the random sample of the relation wherein a size of the random sample is maintained between an upper bound and a lower bound, when the size of the random sample is below the upper bound, and to replace a tuple of the random sample, selected uniformly at random, with the given tuple when the size of the random sample is not below the upper bound.

23. A method of maintaining a random sample of a relation in a database, comprising the steps of:
    deleting one or more existing tuples of the random sample in response to an update to the relation, the size of the random sample having an upper bound associated therewith; and replacing a selected tuple of the random sample with a given tuple, associated with an update to the relation, whether or not the size of the random sample is below the upper bound.

24. An apparatus for use in maintaining a random sample of a relation in a database, comprising:

a memory for storing the relation; and a processor coupled to the memory and operative to delete one or more existing tuples of the random sample in response to an update to the relation, the size of the random sample having an upper bound associated therewith, and to replace a selected tuple of the random sample with a given tuple, associated with an update to the relation, whether or not the size of the random sample is below the upper bound.

25. A method of maintaining a random sample of a relation in a database, comprising the steps of:

storing the random sample in one or more blocks of memory separate from the relation such that storage therewith of information not associated with the random sample is reduced; and updating the random sample in response to one or more updates to the relation, wherein a size of the random sample is maintained between an upper bound and a lower bound.

26. An apparatus for use in maintaining a random sample of a relation in a database, comprising:

a memory for storing the relation and for storing the random sample in one or more blocks of memory separate from the relation such that storage of information with the random sample not associated therewith is reduced; and a processor coupled to the memory and operative to update the random sample in response to one or more updates to the relation, wherein a size of the random sample is maintained between an upper bound and a lower bound.

* * * * *